(12) United States Patent
Erving et al.

(10) Patent No.: US 8,023,428 B2
(45) Date of Patent: Sep. 20, 2011

(54) METHOD AND APPARATUS FOR QOS IMPROVEMENT WITH PACKET VOICE TRANSMISSION OVER WIRELESS LANS

(75) Inventors: Richard Henry Erving, Piscataway, NJ (US); Robert Raymond Miller, II, Convent Station, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 12/625,479

(22) Filed: Nov. 24, 2009

(65) Prior Publication Data

US 2010/0070267 A1    Mar. 18, 2010

Related U.S. Application Data

(63) Continuation of application No. 11/648,239, filed on Dec. 29, 2006, now Pat. No. 7,630,353, which is a continuation of application No. 10/108,863, filed on Mar. 29, 2002, now Pat. No. 7,164,672.

(51) Int. Cl.
*H04L 12/56* (2006.01)
*H04J 1/16* (2006.01)

(52) U.S. Cl. .................. 370/252; 370/338

(58) Field of Classification Search .......... 370/252, 370/338
See application file for complete search history.

(56) References Cited

U.S. PATENT DOCUMENTS

| | | | |
|---|---|---|---|
| 4,701,954 A | 10/1987 | Atal | |
| 5,600,754 A | 2/1997 | Gardner et al. | |
| 5,907,822 A * | 5/1999 | Prieto, Jr. | 704/202 |
| 6,366,961 B1 * | 4/2002 | Subbiah et al. | 709/238 |
| 6,804,218 B2 * | 10/2004 | El-Maleh et al. | 370/335 |
| 6,914,637 B1 | 7/2005 | Wolf et al. | |
| 6,918,034 B1 | 7/2005 | Sengodan et al. | |
| 7,164,672 B1 | 1/2007 | Erving et al. | |
| 7,630,353 B1 | 12/2009 | Erving et al. | |

OTHER PUBLICATIONS

BS. Atal et al., Analysis and Synthesis by Linear Prediction of the Speech Wave, The Journal of Acoustical Society of America, vol. 50, No. 2 (Part 2), pp. 637-650 (Apr. 1971).

* cited by examiner

*Primary Examiner* — John Pezzlo

(57) ABSTRACT

A method for improving packetized speech transmitted over a wireless LAN is disclosed. Speech packets transmitted over the wireless LAN are monitored for errors. Any of the speech packets found to have errors are replaced with synthesized speech packets. The synthesized speech packets may be created from a vocal tract model generated from the received speech packets during periods of time when there are no errors.

16 Claims, 5 Drawing Sheets

METHOD AND APPARATUS FOR QOS IMPROVEMENT WITH PACKET VOICE TRANSMISSION OVER WIRELESS LANS

This application is a continuation of U.S. patent application Ser. No. 11/648,239, filed Dec. 29, 2006 now U.S. Pat. No. 7,630,353, now allowed, which is a continuation of U.S. Ser. No. 10/108,863, filed Mar. 29, 2002, now U.S. Pat. No. 7,164,672, where the above cited applications are all herein incorporated by reference in their entirety.

TECHNICAL FIELD

The present invention relates to the field of wireless LANs. More specifically, the present invention relates to methods and apparatuses for QoS improvement of speech transmission over wireless LANs.

BACKGROUND OF THE INVENTION

Speech transmission over wireless radio-based LANs (Local Area Networks), such as IEEE 802.11 LANs, are currently implementing protocol enhancements in the MAC layer, which can allow better transport of time-sensitive traffic, like speech. These protocols frequently utilize reservation techniques to minimize loss of packets due to contention.

However, most wireless LAN modems are implemented with radio architectures which either do not offer space diversity (sampling of an electromagnetic wave at more than one point in space) or utilize only switched diversity (use of a second antenna when the primary is found to be in a "null"). As a consequence, these implementations may, even with a contention free MAC protocol, experience some packet loss.

Some types of radio communication systems, such as cellular, utilize special voice compression coding techniques which were designed to cope with packet loss due to propagation. In general, these coding techniques were designed for use with specific standards (e.g. ANSI-136, VSELP, GSM LPC-RPE, etc.). However, the trend today is to use packet radio systems to convey multimedia coding identical to that used in the wireline network (G.711 64 Kbps PCM, etc.). Such coders were designed to operate with error rates considerably below those normally experienced in radio environments. Accordingly, some exhibit audible impairments when subjected to substantial packet losses.

Since wireless LANs are now being contemplated as a means for voice transport as well as data transmission in enterprise, home, and public environments, it is important that users experience the same quality of service (QoS) as they would obtain with a wireline connection. Although combinational diversity (simultaneous sampling of an E-M wave at two or more points in space using separate receivers with intelligent algorithms to minimize error rate) combined with improved forward error correction (FEC) coding may become a feature of next-generation wireless LAN systems, the cost, size and power dissipation of such solutions currently makes them unattractive to consumers.

Accordingly, what is needed is a wireless LAN system and method that will allow voice and data transport and provide a high QoS, with a more reasonable cost, size and power dissipation than conventional systems and methods.

SUMMARY OF THE INVENTION

Embodiments of the present invention include a method for improving packetized speech transmitted over a wireless LAN. Speech packets transmitted over the wireless LAN are monitored for errors. Any of the speech packets found to have errors are replaced with synthesized speech packets. The synthesized speech packets may be created from a vocal tract model generated from the received speech packets during periods of time when there are no errors.

An alternate embodiment includes a method for improving speech sub-packets transmitted over a wireless LAN. Speech sub-packets transmitted over the wireless LAN are monitored for errors. Any of the speech sub-packets found to have errors are replaced with synthesized speech sub-packets. The sub-packets of speech found not to have errors are combined with the synthesized sub-packets of speech to form packets of speech. The synthesized speech sub-packets may be created from a vocal tract model generated from the received speech sub-packets during periods of time when there are no errors.

BRIEF DESCRIPTION OF THE DRAWINGS

Embodiments of the present invention are illustrated by way of example, and not limitation, in the accompanying figures in which like references denote similar elements, and in which.

DETAILED DESCRIPTION

Figure 1:
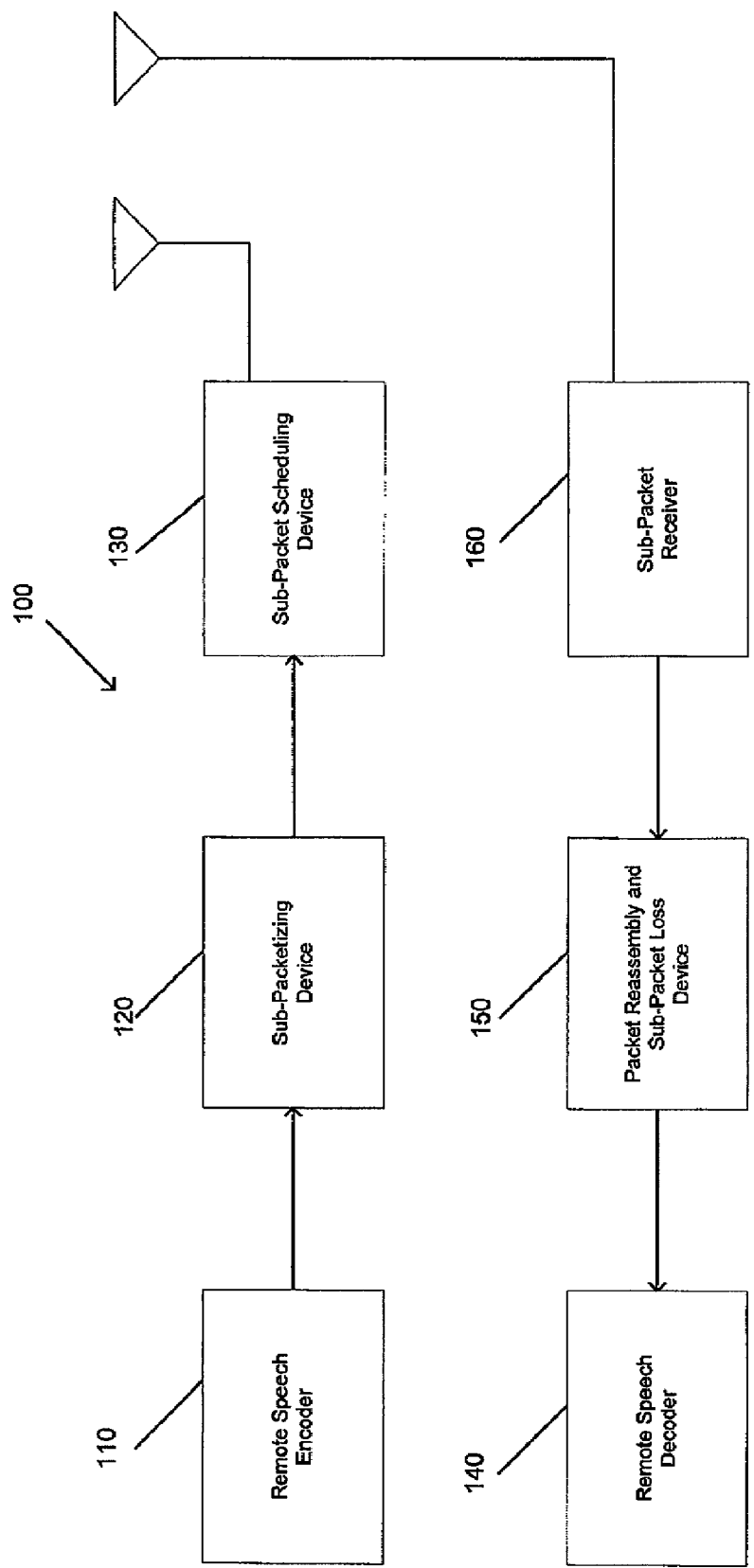
FIG. 1 is a block diagram of a wireless packet speech system of the present invention.

FIG. 1 illustrates a wireless packet speech system 100 of the present invention. The remote speech encoder 110 may collect and encode speech into packets. Each encoded packet may contain 20 mS of speech, for example. A sub-packetizing device 120 may be employed to break down packets output from the remote speech encoder 110 into smaller packets. The smaller packets may go through a sub-packet scheduling process 130. The sub-packet scheduling process ensures that the individual sub-packet transmissions are separated in time from each other. For example, if a packet representing 20 mS of speech were to be broken up into five (5) sub-packets, the sub-packet scheduling process would transmit the sub-packets at 20 mS÷5=4 mS intervals, thus providing a measure of time diversity to the transmission process.

The sub-packets are received by a sub-packet receiver 160, which may be a conventional receiver used with wireless LANs, for example. The sub-packets are checked for errors and if no errors are found, they are reassembled into packets, by the packet re-assembly and sub-packet loss device 150. If any packets are found to be in error, the packets may be replaced with synthesized speech packets before re-assembly. This may be accomplished by including in the packet re-assembly and sub-packet loss device 150 the voice follower system 330 described below in connection with FIGS. 3 and 4. After re-assembly into packets, the packets are sent to the remote speech decoder 140 for decoding into audible speech. The remote speech decoder may be a conventional decoder.

The errors that may be detected include missing sub-packets or sub-packets having a signal quality below a predetermined threshold. By breaking down the packets into sub-packets, more data may be received uncorrupted than if the data is transmitted in the original larger packets. Then, only sub-packets that are received in error have to be replaced, resulting in a greater percentage of the speech being received without errors.

Figure 2:
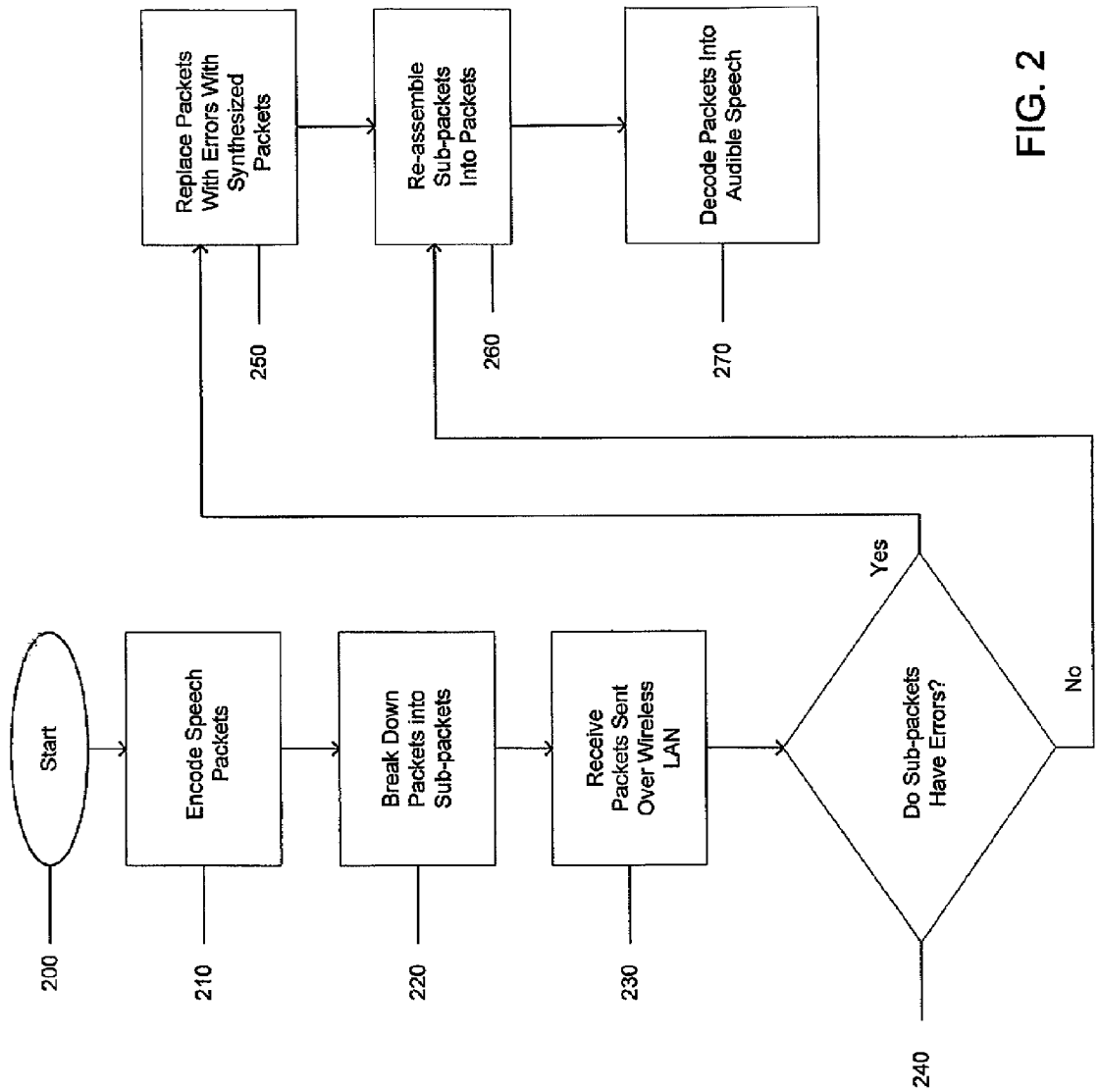
FIG. 2 is a flowchart in accordance with an embodiment of the present invention.

FIG. 2 is a flowchart illustrating steps carried out by the system of FIG. 1. In 210, speech packets are encoded by a conventional speech encoder. In 220, the encoded packets are broken down into sub-packets.

In 230, the packets are received after being transmitted over a wireless LAN. In 240, it is determined whether each sub-packets has an error. If a sub-packet has an error, in 250 the sub-packet is replaced with a synthesized sub-packet. Any sub-packets that do not have an error are passed directly to 260. At 260 the sub-packets are re-assembled into packets, with any sub-packets having errors replaced by synthesized sub-packets. At 270, the packets are decoded into audible speech.

Figure 3:
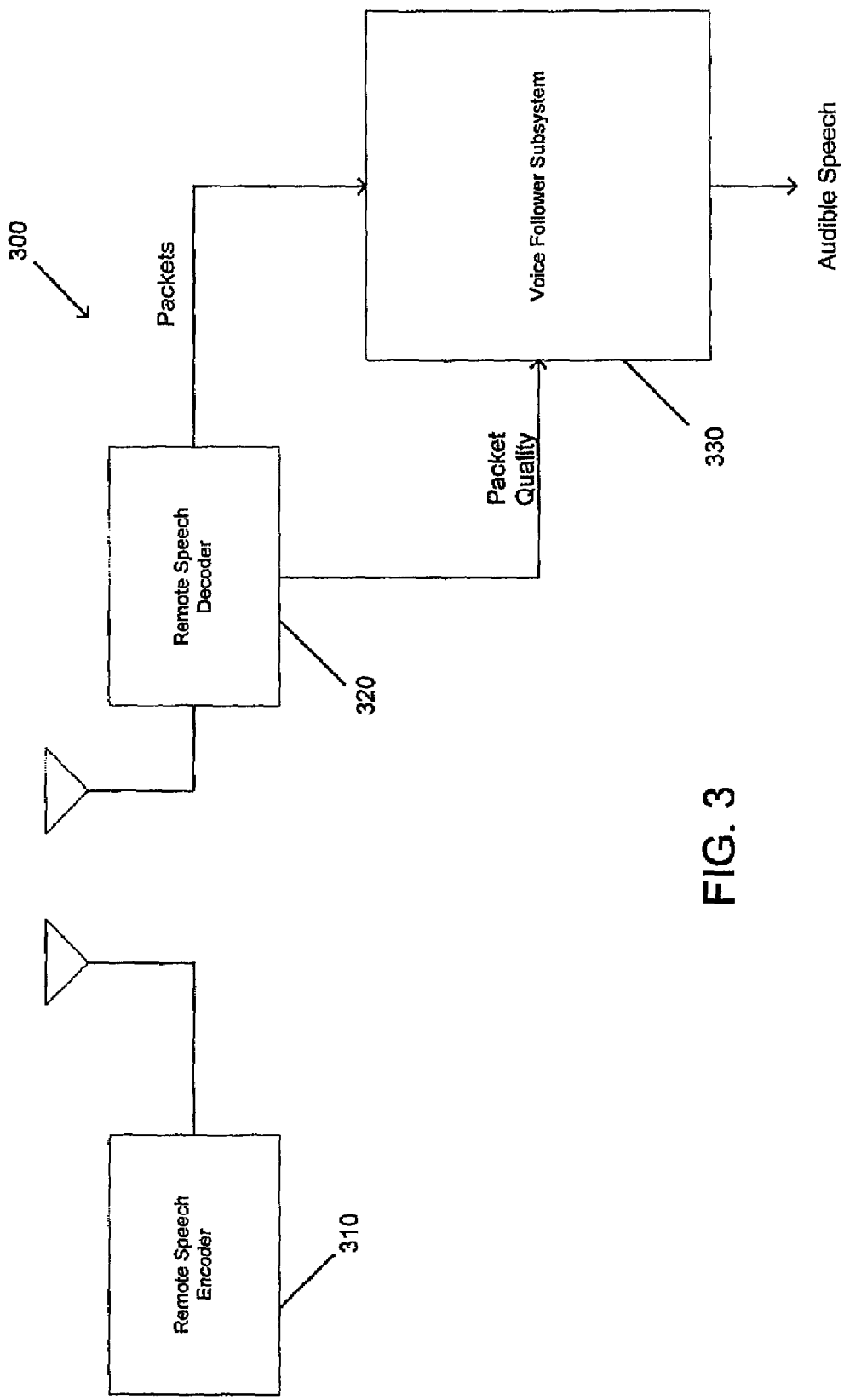
FIG. 3 is a block diagram of a wireless packet speech system in accordance with an embodiment of the present invention.

FIG. 3 illustrates a wireless packet speech system 300 in accordance with an embodiment of the present invention. A remote speech encoder 310 may collect and encode speech into encoded packets. Each encoded packet may contain 20 mS of speech, for example. The packets may be transmitted across a radio-base wireless LAN, for example. The packets may be received by a remote speech decoder 320, which may decode the encoded packets into speech packets.

The remote speech decoder may include means to determine the signal quality of each packet. The signal quality is forwarded to the voice follower subsystem 330. The packets are also forwarded to the voice follower subsystem 330. The voice follower subsystem determines if any packets have errors, based on whether any packets are missing, or whether any packets fall below a predetermined signal quality threshold. Any packets determined to have errors are replaced by the voice follower subsystem 330, as further explained below.

The voice follower subsystem 330 receives packets of speech data from the remote speech decoder 320. During periods of time when packets of speech data are received error free, the packets are used to build a vocal tract model using conventional speech coder technology. For an example of how such speech data can be used to build such a vocal tract model, see B.S. Atal, Suzanne L. Hanauer, "Speech Analysis and Synthesis by Linear Prediction of the Speech Wave", The Journal of the Acoustical Society of America, vol. 50, No. 2 (Part 2), pp. 637-650 (April 1971); U.S. Pat. No. 4,701,954 entitled Multiphase LPC Speech Processing Arrangement, the entire disclosures of which are incorporated herein.

During periods of time when no errors are present, the voice follower subsystem has no effect on the speech, other than to pass the speech through and update the vocal tract model. When packets are received with errors, the packets are replaced with synthesized speech packets created from the vocal tract model. The synthesized packets are inserted in place of the packets with errors, so that the quality of the audible speech generated therefrom is improved.

Figure 4:
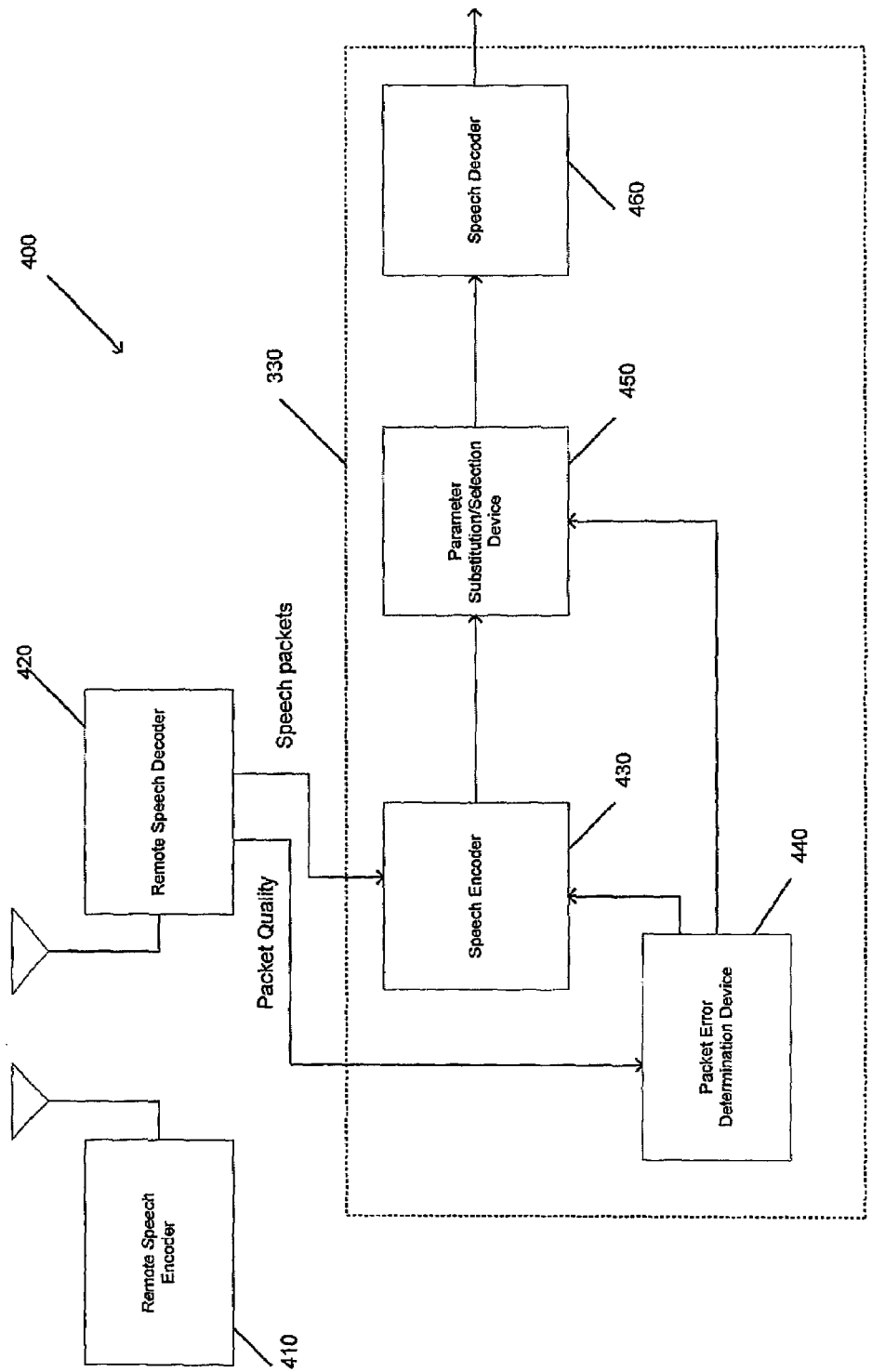
FIG. 4 is a block diagram illustrating further details of the wireless packet speech system of FIG. 4.

Further details of the voice follower subsystem 330 are illustrated in the system 400 of FIG. 4. As in the embodiment of FIG. 3, a speech encoder 410 encodes speech packets, which are transmitted over a radio-based wireless LAN. The remote speech decoder 420 receives the encoded speech packets and decodes them.

The speech encoder 430 receives the speech packets and forms a vocal tract model of the speech during times when no errors are present. During times when packets are determined to have errors by the packet error determination device 440, the speech encoder stops updating the vocal tract model, and generates synthesized speech. The packet error determination device 440 will inform the parameter substitution/selection device 450 that an error is present, and the synthesized packet generated by the speech encoder will replace the packet with an error under control of the parameter substitution/selection device 450. As explained above, the packet error determination device will detect errors when a packet is missing or has a signal quality below a predetermined threshold. However, one skilled in the art could program the device to determine errors based on various other desired factors.

The speech decoder 460 receives the speech packets either unmodified as received from decoder 420, when no errors are detected, or, when errors are detected, with a combination of error packets replaced by the synthesized speech and packets without errors unmodified. The decoder 460 then converts the packets to audible speech.

Figure 5:
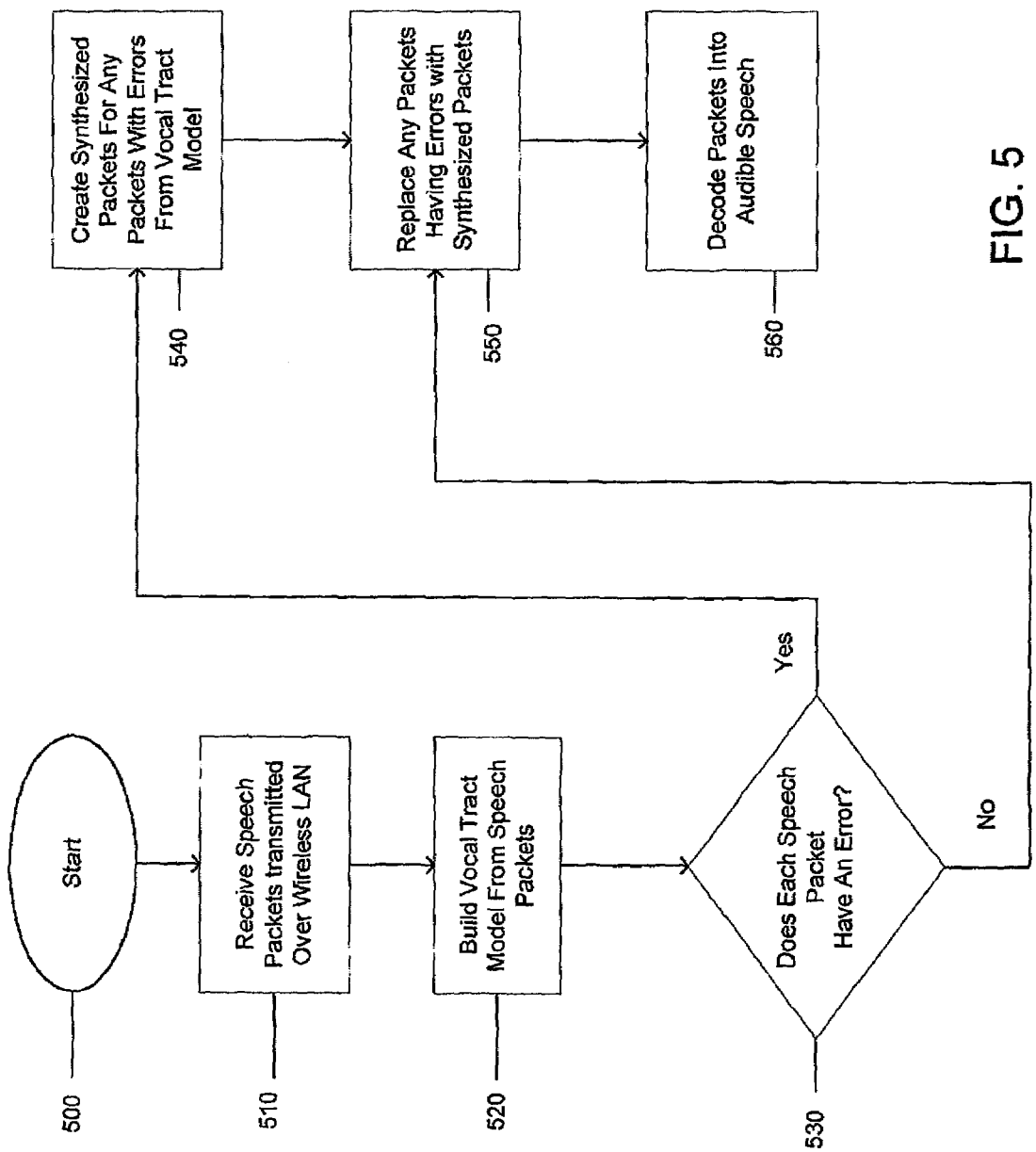
FIG. 5 is a flowchart in accordance with an embodiment of the present invention.

FIG. 5 is a flowchart illustrating the steps carried out by the system of FIG. 4. In 510, speech packets are received that are transmitted over a wireless LAN. In 520, a vocal tract model is built from the speech packets, as described above. In 530, it is determined whether each speech packet has an error. For any speech packets that have an error, in 540 a synthesized speech packet is created from the vocal tract model.

In 550, any packets found to have errors are replaced by the corresponding synthesized speech packet. In 560, the speech packets are decoded into audible speech.

The embodiments described above may be combined. More specifically, the flowchart of FIG. 2 could include the vocal tract model being built from the speech packets to generate the synthesized speech packets for any packets found to have an error.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method for improving packetized speech transmitted over a wireless local area network, comprising:
   receiving a plurality of sub-packets of speech transmitted over the wireless local area network, wherein the plurality of sub-packets of speech was generated by breaking down an encoded packet of speech;
   monitoring each sub-packet of speech of the plurality of sub-packets of speech for an error; and
   if a sub-packet of speech of the plurality of sub-packets is found to have an error, creating a synthesized speech sub-packet, and replacing the sub-packet of speech having the error with the synthesized speech sub-packet.

2. The method of claim 1, further comprising:
   creating a vocal tract model from the plurality of sub-packets of speech; and
   creating the synthesized speech sub-packet from the vocal tract model.

3. The method of claim 1, further comprising mixing sub-packets of speech found not to have the error with synthesized speech sub-packets replacing any of the sub-packets of speech found to have the error.

4. The method of claim 1, wherein when the plurality of sub-packets of speech are deemed not to have the error, passing the plurality of sub-packets of speech without modification.

5. The method of claim 1, further comprising:
   determining whether a speech sub-packet is missing; and
   if the speech sub-packet is missing, determining that the speech sub-packet has an error.

6. The method of claim 1, further comprising converting any of the plurality of sub-packets found not to have the error and any synthesized speech sub-packets to an audible sound.

7. A method for improving speech sub-packets transmitted over a wireless local area network, comprising:
receiving a plurality of sub-packets of speech transmitted over the wireless local area network, wherein the plurality of sub-packets of speech was generated by breaking down a packet of speech that is encoded;
monitoring each sub-packet of speech for an error; and
if a sub-packet of speech of the plurality of sub-packets is found to have the error, creating a synthesized speech sub-packet, and replacing the sub-packet of speech having the error with the synthesized speech sub-packet; and
combining any sub-packets of speech of the plurality of sub-packets found not to have the error with the synthesized sub-packet of speech to form the packet of speech.

8. The method of claim 7, further comprising:
creating a vocal tract model from the plurality of sub-packets of speech; and
creating the synthesized speech sub-packet from the vocal tract model.

9. The method of claim 7, further comprising:
determining whether a speech sub-packet is missing; and
if the speech sub-packet is missing, determining that the speech sub-packet has an error.

10. The method of claim 7, further comprising converting any of the plurality of sub-packets found not to have the error and any synthesized speech sub-packets to an audible sound.

11. A system for improving packetized speech transmitted over a wireless local area network, comprising:
means for receiving a plurality of sub-packets of speech transmitted over the wireless local area network, wherein the plurality of sub-packets of speech was generated by breaking down an encoded packet of speech;
means for monitoring each sub-packet of speech of the plurality of sub-packets of speech for an error; and
if a sub-packet of speech of the plurality of sub-packets is found to have an error, means for creating a synthesized speech sub-packet, and replacing the sub-packet of speech having the error with the synthesized speech sub-packet.

12. The system of claim 11, further comprising:
means for creating a vocal tract model from the plurality of sub-packets of speech; and
means for creating the synthesized speech sub-packet from the vocal tract model.

13. The system of claim 11, further comprising:
means for mixing sub-packets of speech found not to have the error with synthesized speech sub-packets replacing any of the sub-packets of speech found to have the error.

14. The system of claim 11, wherein when the plurality of sub-packets of speech are deemed not to have the error, passing the plurality of sub-packets of speech without modification.

15. The system of claim 11, further comprising:
means for determining whether a speech sub-packet is missing; and
if the speech sub-packet is missing, means for determining that the speech sub-packet has an error.

16. The system of claim 11, further comprising:
means for converting any of the plurality of sub-packets found not to have the error and any synthesized speech sub-packets to an audible sound.

* * * * *